(12) United States Patent
Syed et al.

(10) Patent No.: US 11,258,860 B2
(45) Date of Patent: Feb. 22, 2022

(54) SYSTEM AND METHOD FOR BOT DETECTION AND CLASSIFICATION

(71) Applicant: ServiceNow, Inc., Santa Clara, CA (US)

(72) Inventors: Jaheen Afsar Syed, Hyderabad (IN); Prabhat Mishra, Pratapgarh (IN); Ramola Raj Teketi, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/726,529

(22) Filed: Dec. 24, 2019

(65) Prior Publication Data

US 2021/0194969 A1 Jun. 24, 2021

(51) Int. Cl.
| | | |
|---|---|---|
| H04L 29/08 | (2006.01) | |
| G06F 16/951 | (2019.01) | |
| H04L 12/24 | (2006.01) | |
| G06Q 20/14 | (2012.01) | |
| H04L 67/141 | (2022.01) | |
| H04L 67/1097 | (2022.01) | |
| H04L 41/5051 | (2022.01) | |
| H04L 67/02 | (2022.01) | |

(52) U.S. Cl.
CPC .......... *H04L 67/141* (2013.01); *G06F 16/951* (2019.01); *H04L 41/5051* (2013.01); *H04L 67/1097* (2013.01); *G06Q 20/14* (2013.01); *H04L 67/02* (2013.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |

(Continued)

OTHER PUBLICATIONS

Sitecore et al. "Sitecore Documentation—Sitecore XP.9.3—Nov. 28, 2019" (Sitecore hereinafter) (Year: 2019).*

*Primary Examiner* — Younes Naji

(74) *Attorney, Agent, or Firm* — Fletcher Yoder PC

(57) ABSTRACT

A computing system includes a server. The server is communicatively coupled to a data repository and is configured to store a data in the data repository. The server is further configured to create a server instance, wherein the server instance is associated with a user. The server is additionally configured to create a session based on an external entity requesting a resource from the server instance, and to execute a bot detection logic to determine if the external entity is a bot. If the external entity is a bot then the server is configured to perform a bot-based action, wherein the server is configured to provide for multi-instance support to a plurality of users.

16 Claims, 7 Drawing Sheets

(56) References Cited

U.S. PATENT DOCUMENTS

| | | | |
|---|---|---|---|
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,856,869 B1 * | 10/2014 | Brinskelle | G06F 21/6218 726/2 |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,326,789 B1 * | 6/2019 | Vines | H04L 67/02 |
| 2009/0119268 A1 * | 5/2009 | Bandaru | G06Q 10/0631 705/7.12 |
| 2015/0319186 A1 * | 11/2015 | Lietz | H04L 63/1433 726/25 |
| 2017/0078319 A1 * | 3/2017 | Thompson | H04L 63/1466 |
| 2017/0195345 A1 * | 7/2017 | Maresca | H04L 63/1416 |
| 2019/0222607 A1 * | 7/2019 | Thatha | H04L 63/1466 |
| 2020/0382535 A1 * | 12/2020 | Herley | G06F 21/554 |

* cited by examiner

SYSTEM AND METHOD FOR BOT DETECTION AND CLASSIFICATION

BACKGROUND

The present disclosure relates generally to bots, and more specifically to systems and methods to detect bots and classify them as "good" or "bad".

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

Within the context of cloud computing solutions for data repositories, users may be asked to deal with ever increasing amounts of data, e.g., including certain date-based information stored in the data repositories. In fact, the amount of cloud-based and date-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of date-based data to properly and efficiently perform their job functions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. For example, user may create a server instance (e.g., including a web portal instance) on-demand, and the server instance may then be used by other guests of the user to receive information, provide information, enable transactions, and so on. Server sessions (e.g., hypertext transfer protocol (HTTP) sessions) may be created to view pages, perform transactions, and so on, billable to the client. Bots, e.g., an autonomous program, may also be allowed, via an anonymous session (e.g., without using login information), to provide for indexing, crawling, and so on if they are identified as good bot and stop the bad bot from making any new transaction. It would be beneficial to identify the bots to perform certain tasks, including automated billing tasks and stop bad bot from unwanted utilization of resources. For example, human activity may be billed to the client, while bot activity may not be billed but may be allowed to continue if they are identified as good.

The current embodiments enable systems and methods that may be used to detect bots and/or classify whether the bots are "good" or "bad." In certain embodiments, an asynchronous non-blocking transaction bot detection mechanism may be executed only once per session to detect if the session is bot-based. For example, a session may include multiple transactions, and by using an asynchronous mechanism that is executed only once per session the other transactions in the session may be unaffected or minimally affected. Further efficiency improvements include the use of session attributes and an in-memory (e.g., cached) list of bots to improve speed of bot detection, as further described. By using the techniques described herein, a multi-instance system may more efficiently interact with external entities such as bots.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
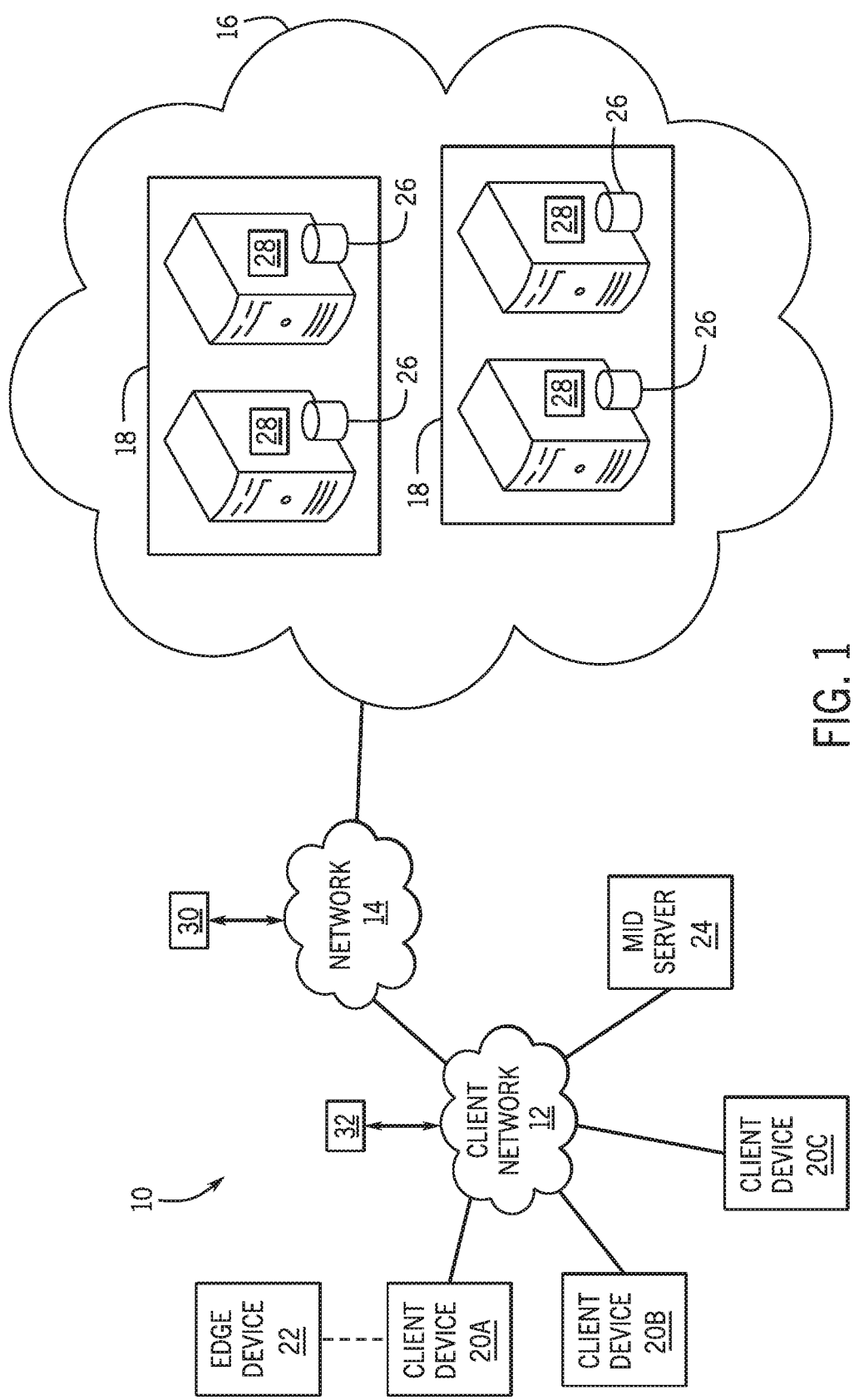
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "bot" may refer to an automated program, such as a web crawler, a web page indexer, and the like, that may interact over a network with a server. As used herein, the term "instance" may refer to portal (e.g., web portal) instances, virtual server instances, application instances, and/or application server instances. Each instance may be associated with a user, such as a client, that may be billed for activities (e.g., sessions) processed by the instance.

Present embodiments are directed to providing for the detection and classification of bots that may be interacting (e.g., indexing pages, web crawling) with one or more instances. For example, a user (e.g., client) may provide an instance that includes a client's web portal, such as a customer service management (CSM) portal. A bot may initiate a session (e.g., HTTP session) useful in crawling a set of CSM portal pages for indexing purposes. Likewise, a human guest user may visit the CSM portal pages to view and/or to enter certain information. However, it may be beneficial to process a bot session differently from a human session. For example, a bot crawler session may be provided free of charge to a customer, the bot crawler session may be executed at a lesser priority, the bot crawler session may not have access to certain resources (e.g., web pages, services, etc.), and so on.

In certain embodiments, each client instance may include a trigger that gets executed only once per session. The trigger activation may include an asynchronous process which may then determine if the trigger was activated by a bot, as further described below. Certain optimizations, including the use of session attributes and cached bot lists may also be used, which may improve bot detection efficiency. By providing for techniques to detect bots, including bots interacting with various instances, the systems and methods described herein may enable more flexible and efficient multi-instance systems.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes and segregates between data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

It would be beneficial to more efficiently process bots in multi-instance or multi-tenant architectures. Accordingly, a bot detection system 28 may be provided, to be applied to detect, classify, and to process various bots. For example, bot systems 30, such as third party bots (e.g., crawler bots, indexing bots, information gathering bots, and so on), may interact with server instances 26 via networks 12 and/or 14 by creating one or more sessions. For example, a client user may have one or more server instances 26 that include one or more customer service management portals (e.g., web portals). Human users 32 (e.g., guest users) may additionally interact with the server instances 26 via networks 12 and/or 14. The bot detection system 28 may differentiate between bots 30 and human users 32, as further described below.

Figure 2:
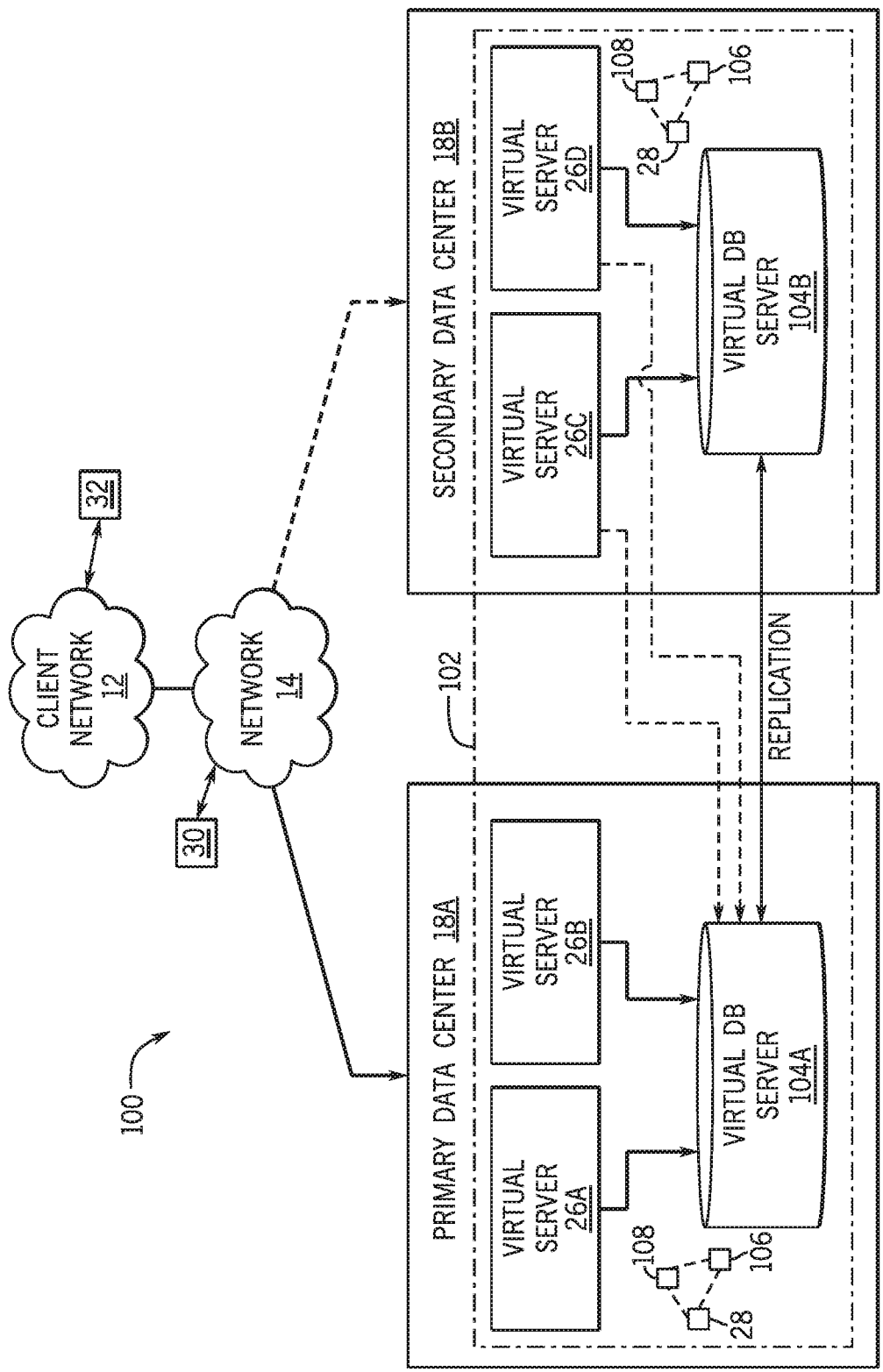
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, the bot detection system 28 may provide for a bot identification process using a user agent string (e.g., HTTP user-agent string) or IP address or any such parameters, as input based on where a particular instance session 106 is originating. The bot detection system 28 may execute the bot identification process in an asynchronous call of a transaction listener 108, which may be triggered to execute on a "transaction complete notify listeners" trigger incoming from the instance 106 where the actual bot identification takes place. Accordingly, a transaction overhead time may be minimized. The bot detection logic may be computed only once for a particular session, e.g., when the session is newly created. Accordingly, redundant logic not executed on the same session again. An in-memory cache storing certain user agent information may be used for querying a user agent string provided during bot detection. The classification of bot (and type of bot) may thus be faster and more efficient than querying a database table, as further described below.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
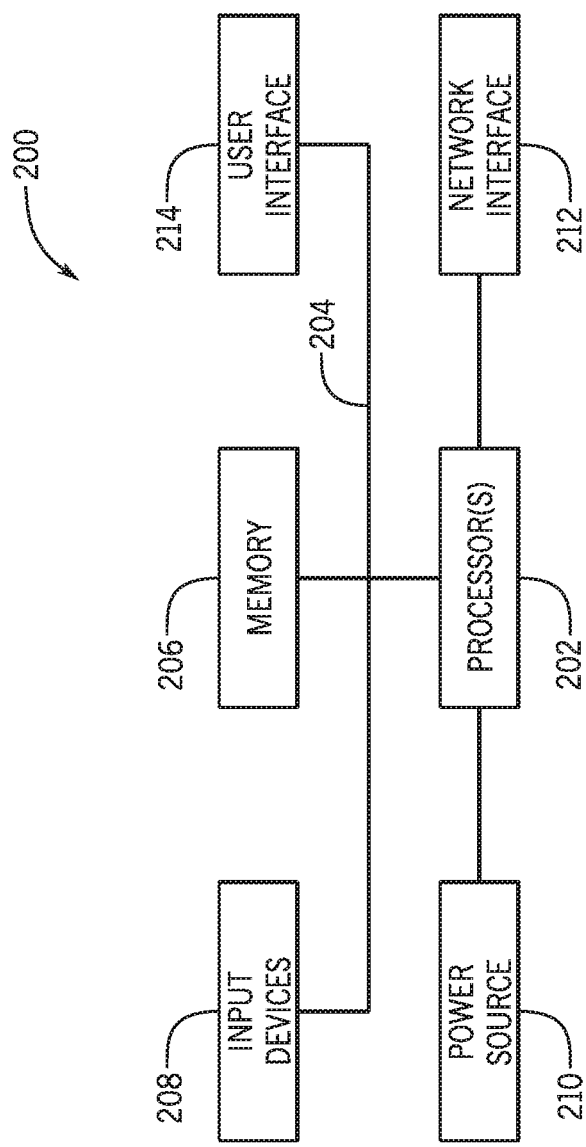
FIG. 3 is a block diagram of a computing device utilized in a computing system that may be present in FIG. 1 or 2, in which embodiments of the present disclosure may operate.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
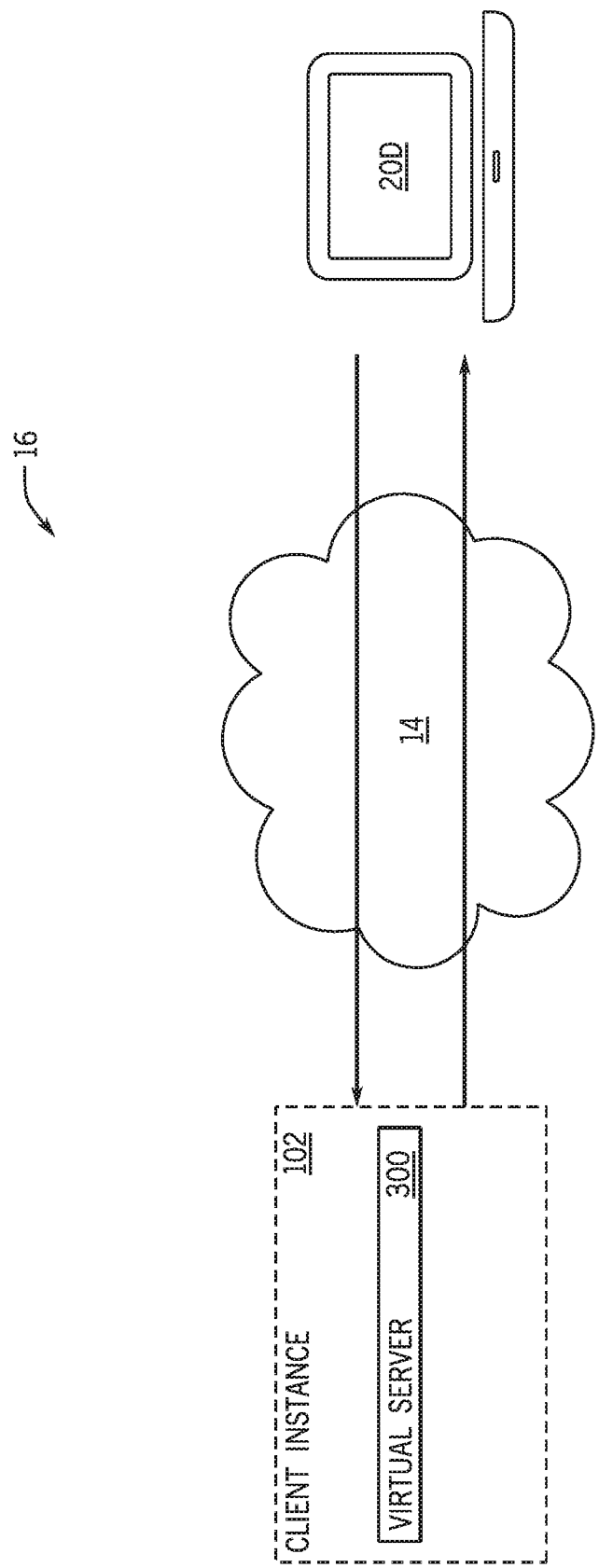
FIG. 4 is a block diagram illustrating an embodiment in which a virtual server supports and enables the client instance of FIG. 2, in which embodiments of the present disclosure may operate.

FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5A:
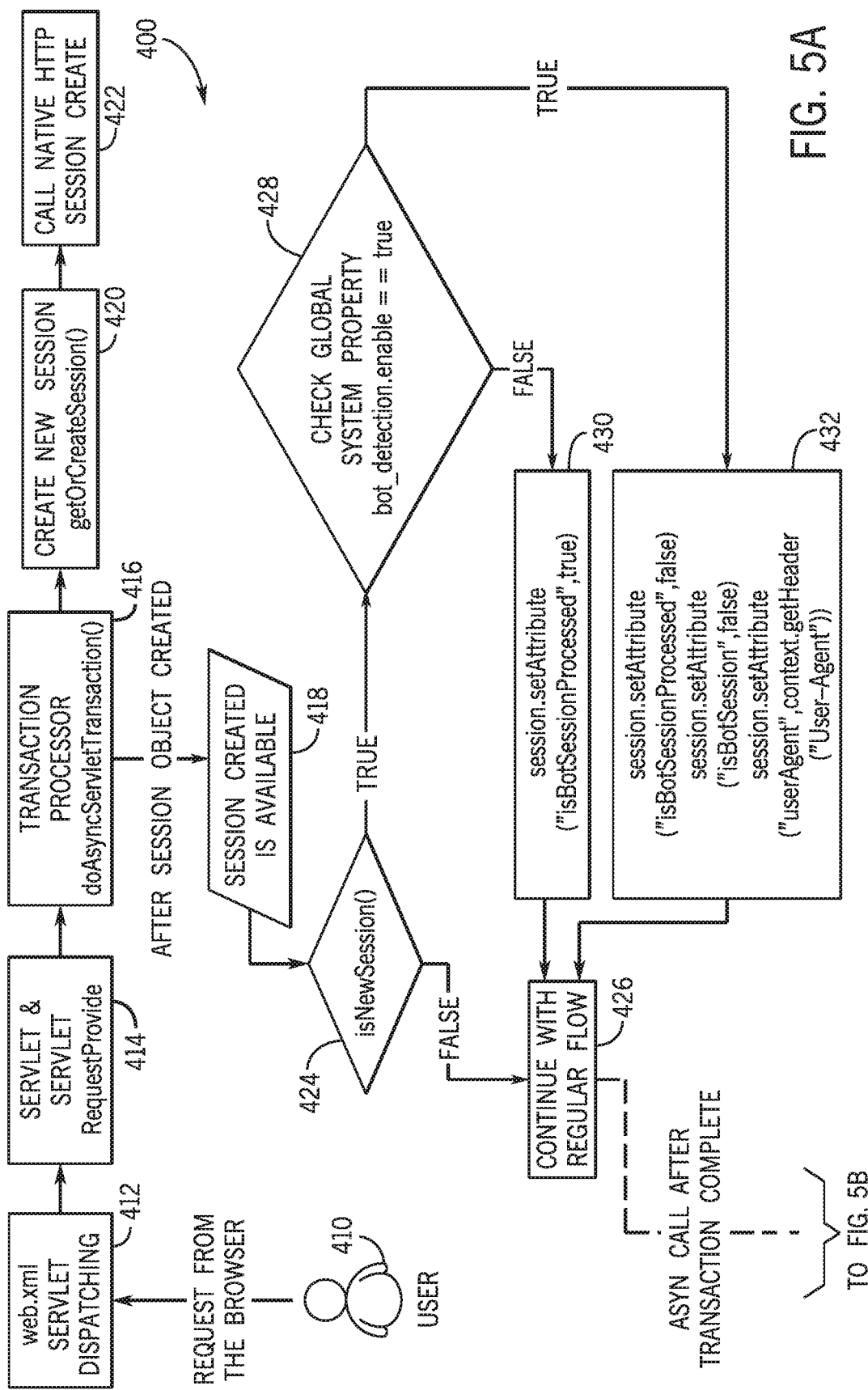
FIGS. 5A and 5B are a flowchart of an embodiment of a process suitable for detecting bot activity in the virtual server of FIG. 4, in which embodiments of the present disclosure may operate.
Figure 5B:
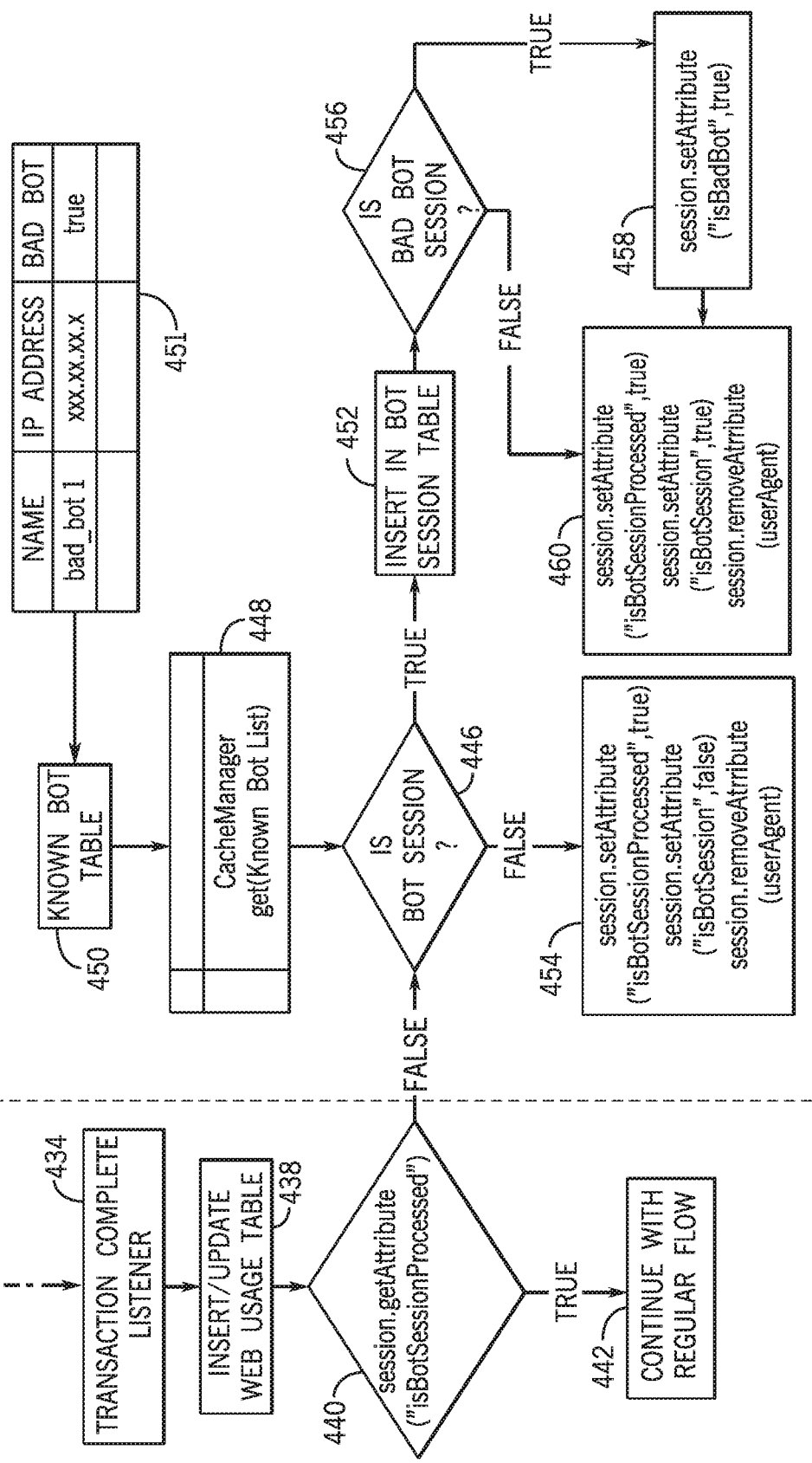

It may be beneficial to describe certain computing resources that may be used in accordance with the techniques described herein. Turning now to FIGS. 5A and 5B, the figures depict a flowchart illustrating an embodiment of a process 400 that may be used, for example, to detect bot activity in a given instance, such as the client instance 102. The process 400 may be implemented as computer code stored in the memory 206 and executable by processor(s) 202. In the illustrated embodiment, an external entity 410, which may include a human as well as a bot, may interact, for example, with the client instance 102 to request, e.g., via a web browser, certain web information (e.g., web pages). A deployment descriptor 412 (e.g., web.xml file) may be used to describe classes, resources, and/or configuration for a web application that may process the user's request. For example, a web server (e.g., included in the instance's server 300) may receive the external entity's request and then use the deployment descriptor 412 to map a URL in the request to execute a code (e.g., Java code) suitable for handling the request.

In the depicted example, a servlet 414 may be executed based on the deployment descriptor 412, which in turn may execute a server-side code, such as an asynchronous transaction processor 416 suitable for asynchronously creating a new session 418. That is, the asynchronous transaction processor 416 may execute server-side code such as a getOrCreateSession 420, which in turn may call a native HTTP sesssioncreate code 422 to create the new session 418 executing in the client instance 102. The process 400 may derive (decision 424) if a session is a new session. If the session is not a new session, then the process may continue (block 426) with regular execution flow logic. If the session is a new session, then the process 400 may check (decision 428) a global (e.g., instance-wide) property. For example, a bot_detection.enable property may be checked to see if bot detection should proceed. The bot_detection.enable property may be set for instances where bot detection is desired.

If the bot_detection.enable property is set to false (decision 428), the process 400 may set a session attribute (block 430), such as isBotSessionProcessed, to true, and then continue (block 426) with regular execution flow logic. If the bot_detection.enable property is set to true (decision 428), the process 400 may set the session attribute (block 432), such as isBotSessionProcessed, to false. The process 400 may additionally set (block 432) an isBotSession attribute to false and set a userAgent attribute based on a User-Agent HTTP header content. The process 400 may then continue (block 426) with regular execution flow logic.

The blocks following block 426 may be triggered, for example, based on certain listener daemons or processes (e.g., listener 108) executing in the background. Accordingly, the listener may be, in the depicted embodiment, a "transaction complete" listener(s) 434 that may be used to monitor certain requests, e.g., web requests. For example, the web requests may be logged (e.g., via insert/updates) in table, such as a web usage relational database table 438.

The process 400 may then determine (decision 440) if the isBotSessionProcessed session attribute is true or false. If the process 400 determines (decision 440) that the isBotSessionProcessed session attribute is true, then the session has already been processed and the process 400 may then continue (block 442) with regular execution flow logic. If the process 400 determines (decision 440) that the isBotSessionProcessed session attribute is false, then the process 400 initiates a bot detection manager 444. The bot detection manager 444 may determine (decision 446) if the session is a bot session.

In the depicted embodiment, the bot detection manager 444 may use a cache, e.g., via a cache manager 448, to determine if the session is a bot session. For example, a table or list 450 storing known bot properties 451 may be kept as part of a cache. The known bot properties 451 may include user-agent strings, IP addresses, as well as a "bad bot" Boolean value that may be used to define if the bot is useful or not. In use, the bot detection manager 444 may query the table or list 450 via the cache manager 448. If the user-agent string or the IP address procured, for example, at block 432 matches known bot user-agent strings or the IP address then the session is labeled as a bot session (decision 446). If the user-agent string does not match against the table or list 450, then the session is labeled as a non-bot session (decision 446).

If the session is labeled a bot session, then then process 400 may log (block 452) the bot session, for example, by inserting a record in a bot session table. The logging (block 452) may include storing the user-agent string, a session ID, IP address, whether good or bad bot, a date, a time, bot activity (e.g., request(s) issued by the bot), and the like. If the session is not labeled a bot session, the process 400 may set (block 454) the IsBotSessionProcessed attribute to true, the IsBotSession attribute to false and perform certain clean-up tasks, such as removing the userAgent attribute.

As depicted, the process 400 may determine (decision 456) if the session is a bad bot session. For example, the stored properties 451 may be queried based on the bot name, the IP address, or both, and a "bad bot" property may return true if the bot is a "bad" bot. The process 400 may then set (block 458) an IsBadBot attribute to true if a bad bot is identified. The process 400 may then also set (block 460) the IsBotSessionProcessed attribute to true, the IsBotSession attribute to true and perform certain clean-up tasks, such as removing the userAgent attribute. If the session is labeled a "good" bot session, the process 400 may then likewise set (block 460) the IsBotSessionProcessed attribute to true, the IsBotSession attribute to true, and perform certain clean-up tasks, such as removing the userAgent attribute. By using asynchronous non-blocking transaction processing via a cache to more quickly and efficiently detect a bot session and classify as good or bad if needed, the techniques described herein may provide improved bot handling.

Figure 6:
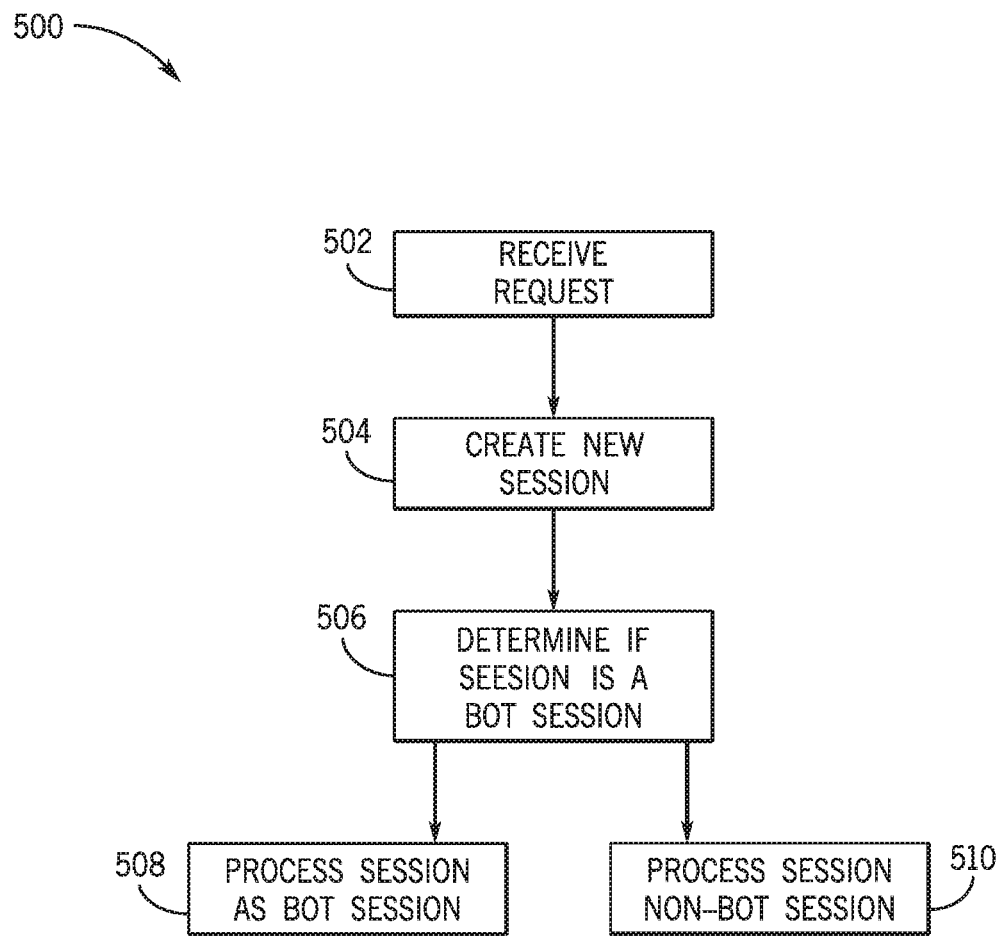
FIG. 6 is a flowchart of an embodiment of a process suitable for handling a session including bot activity in the virtual server of FIG. 4, in which embodiments of the present disclosure may operate.

FIG. 6 is a flowchart depicting an embodiment of a process 500 suitable for processing sessions, such as sessions that may be created based on requests received by the virtual server 300. The process 500 may be implemented a computer code stored in the memory 206 and executable by processor(s) 202. In the depicted embodiment, a server, such as the virtual server 300 executing as part of a client instance 102 may receive (block 502) a request, such as an HTTP request.

The HTTP request may be incoming from a human user or a bot. The process 500 may then create (block 502) a new session to handle the HTTP request and subsequent requests from the same human user or bot. The process 500 may then determine (block 504) if the session that was created based on the request is a bot session or a non-bot session. In certain embodiments, the determination (block 504) of the type of session (e.g., bot, non-bot) may include setting a IsBotSessionProcessed flag to false to notify that the session is not yet processed, and also setting a IsBotSession flag to false noting that currently, the session is labeled as a non-bot session. The flags may be implemented as properties of a class, as described above with respect the process 400. A listener process, such as a daemon process, may "listen" or otherwise monitor the flags, e.g., IsBotSessionProcessed flag.

A logic value of false for the IsBotSessionProcessed may indicate that the session is a new session and that bot identification logic has not been executed. The bot identification logic may include the use of the BotDetector manager as described above. Once the BotDetector manager finishes identifying the session, then the IsBotSessionProcessed flag is set to true and clean up code may, for example, remove certain items from memory (e.g., user agent-related items).

Once the session is identified (block 504), the process 500 may then continue processing the session based on identification of bot or non-bot. For example, "good" bot sessions may be processed (block 506) to allow the bot to crawl through various web pages, retrieve data, and so on, without incurring charge to the client that owns the instance, e.g., client instance 102. Non-bot sessions may be charged to the client that owns the instance and may, for example, be allowed different privileges, access to data, access to certain pages (e.g., pages that use authentication), and so on, when compared to bot sessions.

Before the processes 400, 500 when the transaction complete listeners were invoked, the transaction object did not have any information about the user-agent which initiated the session. In the processes 400 and 500, the session object, which is stored in the server container, is made to hold the user-agent string in the transaction layer, which will be retrieved back when the actual bot identification processing takes place. Once the bot identification process is complete the user agent attribute from the session object is removed, keeping the session object cleaner and lighter. The bot identification processes in process 400, 500 may happen only once for a session, when the session is new.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
at least one memory storing instructions; and
one or more processors configured to execute the instructions to perform operations of a server communicatively coupled to a data repository and configured to store data in the data repository and provide for multi-instance support to a plurality of users, wherein the server is configured to:
create a server instance associated with a user;
create a session based on an external entity requesting a resource from the server instance; and
execute a bot detection logic configured to determine whether the external entity is a bot, classify a type of the bot, and set a Boolean attribute to an initial value of false when bot detection is enabled, wherein the Boolean attribute indicates if the session has been processed for the bot detection, wherein the bot detection logic comprises:
a listener configured to continuously execute during the session in a background process; and
a bot detection manager configured to detect whether the external entity is the bot, wherein the listener is configured to asynchronously initiate the bot detection manager in response to determining that the Boolean attribute is set to false; and
in response to determining that the external entity is the bot, perform a bot-based action.

2. The computing system of claim 1, wherein the bot detection logic is configured to check a global session property to determine when the bot detection is enabled, and wherein the bot comprises a web crawler configured to automatically browse one or more web pages.

3. The computing system of claim 1, wherein requesting the resource comprises transmitting a user agent string, wherein the bot detection manager is configured to detect whether the external entity is the bot based on the user agent string, an IP address of the transmitted user agent string, or a combination thereof.

4. The computing system of claim 1, wherein the bot detection manager is configured to detect whether the external entity is the bot based on a cached list comprising a plurality of user agent strings, a plurality of IP addresses, or a combination thereof.

5. The computing system of claim 1, wherein the server is configured to execute the bot detection logic only once after creating the session.

6. The computing system of claim 1, wherein the server instance is owned by the user and wherein the server is configured to create a plurality of server instances also owned by the user based on a plurality of resource requests.

7. The computing system of claim 1, wherein the bot-based action comprises providing the requested resource to the external entity and not updating a billing account belonging to the user only when the bot is classified as an approved bot.

8. A method, comprising:
creating, via a server communicatively coupled to a data repository and configured to store a data in the data repository and provide for multi-instance support to a plurality of users, a server instance, wherein the server instance is associated with a user;
creating a session based on an external entity requesting a resource from the server instance;
executing a bot detection logic to determine whether the external entity is a bot, classify a type of the bot, and set a Boolean attribute to an initial value of false when bot detection is enabled, wherein the Boolean attribute indicates if the session has been processed for the bot detection, wherein the bot detection logic comprises;
a listener configured to continuously execute during the session in a background process; and
a bot detection manager configured to detect whether the external entity is the bot, wherein the listener is configured to asynchronously initiate the bot detection manager in response to determining that the Boolean attribute is set to false; and
in response to determining that the external entity is the bot, performing a bot-based action.

9. The method of claim 8, comprising checking a global session property to determine when the bot detection is enabled, and wherein the bot comprises a web crawler configured to automatically browse one or more web pages.

10. The method of claim 8, wherein the bot detection manager is configured to detect whether the external entity is the bot based on a cached list comprising a plurality of user agent strings, a plurality of IP addresses, or a combination thereof.

11. The method of claim 8, wherein requesting the resource comprises transmitting a user agent string, wherein the bot detection manager is configured to detect whether the external entity is the bot based on the user agent string.

12. The method of claim 8, comprising executing the bot detection logic only once during the session.

13. A non-transitory, computer-readable medium storing instructions executable by one or more processors of a computing system, wherein, when executed by the one or more processors, the instructions cause the one or more processors to:
create, via a server communicatively coupled to a data repository and configured to store a data in the data repository and provide for multi-instance support to a plurality of users, a server instance, wherein the server instance is associated with a user;
create a session based on an external entity requesting a resource from the server instance;
execute a bot detection logic configured to determine whether the external entity is a bot, to classify a type of the bot, and to set a Boolean attribute to an initial value of false when bot detection is enabled, wherein the Boolean attribute indicates if the session has been processed for the bot detection, wherein the bot detection logic comprises;
a listener configured to continuously execute during the session in a background process; and
a bot detection manager configured to detect whether the external entity is the bot, wherein the listener is configured to asynchronously initiate the bot detection manager in response to determining that the Boolean attribute is set to false; and in response to determining that the external entity is the bot, perform a bot-based action.

14. The computer-readable medium of claim 13, wherein the instructions cause the one or more processors to check a global session property to determine if the bot detection is enabled.

15. The computer-readable medium of claim 13, wherein the bot detection manager is configured to detect whether the external entity is the bot based on a cached list comprising a plurality of user agent strings, a plurality of IP addresses, or a combination thereof.

16. The computer-readable medium of claim 13, comprising instructions configured to execute the bot detection logic only once after creating the session to determine if the external entity is the bot.

* * * * *